(12) United States Patent
Hsieh et al.

(10) Patent No.: US 7,764,525 B2
(45) Date of Patent: Jul. 27, 2010

(54) APPARATUS OF DYNAMIC FEEDBACK CONTROL CHARGE PUMP

(75) Inventors: Chih-Yuan Hsieh, Hsinchu (TW); Lan-Shan Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 139 days.

(21) Appl. No.: 12/128,613

(22) Filed: May 29, 2008

(65) Prior Publication Data

US 2009/0237046 A1   Sep. 24, 2009

(30) Foreign Application Priority Data

Mar. 24, 2008  (TW) .............................. 97110409 A (51) Int. Cl.
*H02M 3/18* (2006.01)
*G05F 1/10* (2006.01)
(52) U.S. Cl. ........................................ 363/60; 327/536
(58) Field of Classification Search ................... 363/59, 363/60; 327/536
See application file for complete search history.

(56) References Cited

U.S. PATENT DOCUMENTS

| | | | | |
|---|---|---|---|---|
| 6,400,211 B1 * | 6/2002 | Yokomizo et al. | ........... | 327/536 |
| 6,411,531 B1 * | 6/2002 | Nork et al. | ..................... | 363/60 |
| 7,250,810 B1 * | 7/2007 | Tsen | .......................... | 327/536 |
| 7,271,642 B2 * | 9/2007 | Chen et al. | .................. | 327/514 |
| 7,554,311 B2 * | 6/2009 | Pan | ............................. | 323/285 |

* cited by examiner

*Primary Examiner*—Shawn Riley
(74) *Attorney, Agent, or Firm*—Jianq Chyun IP Office (57) ABSTRACT

An apparatus of dynamic feedback control charge pump is provided. The apparatus of dynamic feedback control charge pump receives an input voltage through a voltage regulator. The voltage regulator regulates the input voltage to a base voltage according to a control signal. The charge pump receives the base voltage and provides multiple of the base voltage to an output voltage. A feedback unit provides the control signal to the voltage regulator according to the output voltage.

22 Claims, 5 Drawing Sheets

APPARATUS OF DYNAMIC FEEDBACK CONTROL CHARGE PUMP

CROSS-REFERENCE TO RELATED APPLICATION

This application claims the priority benefit of Taiwan application serial no. 97110409, filed Mar. 24, 2008. The entirety of the above-mentioned patent application is hereby incorporated by reference herein and made a part of this specification.

BACKGROUND OF THE INVENTION

1. Field of the Invention

The present invention relates to a charge pump apparatus, in particular, to a charge pump apparatus having dynamic feedback control capability.

2. Description of Related Art

An electronic circuit often needs various power supply voltages of different levels, and thus a charge pump circuit is usually configured to use the existing power supply voltage to generate various power supply voltages of different levels. The charge pump circuit generates the voltages of different levels by boosting (or bucking) the input voltage with a predetermined multiple. Therefore, the levels of the output voltage of the charge pump circuit are closely related to the input voltage. However, in order to extend the applications of the charge pump circuit in various environments (i.e., the input voltage is uncertain when the charge pump circuit is designed), for generating the expected output voltages, usually, a voltage regulator circuit is used to first regulate the levels of the output voltage to a rated voltage, and the charge pump is then used to generate a rated output voltage.

Figure 1:
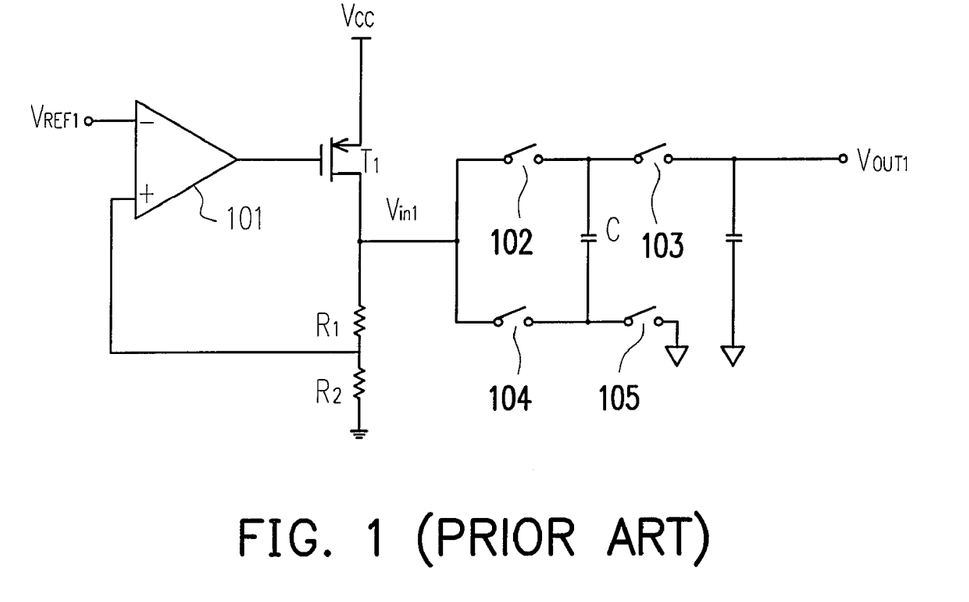
FIG. 1 is a circuit diagram of a conventional charge pump.

FIG. 1 is a circuit diagram of a conventional charge pump. A capacitor C, a switch 102, a switch 103, a switch 104, and a switch 105 form a charge pump. A transistor T1, an operational amplifier 101, a resistor R1, and a resistor R2 form a voltage regulator circuit with a negative feedback. The voltage regulator circuit receives a system voltage $V_{CC}$, and regulates the system voltage $V_{CC}$ to an input voltage $V_{in1}$. In a first duty cycle of the charge pump, the switches 102 and 105 are short-circuited, and the switches 103 and 104 are open-circuited. At this time, the input voltage $V_{in1}$ charges the capacitor C, such that the capacitor C has a potential equal to that of the input voltage $V_{in1}$. In a second duty cycle of the charge pump, the switches 103 and 104 are short-circuited, and the switches 102 and 105 are open-circuited, such that one end of the capacitor C is disconnected from the ground but is connected to the input voltage $V_{in1}$ (i.e., changes from 0V to $V_{in1}$), and the potential at other end of the capacitor C rises $V_{in1}$ to $2V_{in1}$. Therefore, the output voltage $V_{out1}$ that is twice that of the input voltage $V_{in1}$, is obtained.

The conventional charge pump may provide the voltage twice that of the input voltage $V_{in1}$, but when current at the output end of the charge pump changes due to the load variation, the voltage regulator circuit cannot detect and regulate the input voltage $V_{in1}$ in real time according to the change of the output current, such that the output voltage $V_{out1}$ generates a serious ripple problem along with the change of the load current. In order to eliminate the ripple, the charge pump has its input end directly coupled to the system voltage, and its output end coupled to a voltage regulator having a regulator capacitor. However, this solution causes the load problem of the voltage regulator, and the added regulator capacitor also increase the burden of cost, such that the functions of the charge pump cannot be fully exerted.

SUMMARY OF THE INVENTION

Accordingly, the present invention provides an apparatus of dynamic feedback control charge pump, which utilizes a feedback unit to dynamically detect and feed back the output voltage of the charge pump, so as to reduce the output voltage ripple and improve the output efficiency of the charge pump without adding additional elements and cost.

The present invention provides a charge pump apparatus, which includes a voltage regulator, a charge pump, and a feedback unit. The, voltage regulator has an input end for receiving an input voltage, and regulating the input voltage to a base voltage according to a control signal. The charge pump is coupled to an output end of the voltage regulator to receive the base voltage, and provide multiple of the base voltage to an output voltage. The feedback unit has an input end coupled to an output end of the charge pump to receive the output voltage, and an output end coupled to the voltage regulator to provide the control signal. The control signal is related to the output voltage.

In an embodiment of the present invention, the voltage regulator includes an operational amplifier and a transistor. The operational amplifier has a first end coupled to the output end of the feedback unit to receive the control signal, and a second end receiving a reference voltage. The transistor has a gate coupled to an output end of the operational amplifier, a first source receiving the input voltage, and a second source-drain outputting the base voltage.

In an embodiment of the present invention, the feedback unit includes a first resistor and a second resistor. The first resistor has a first end serving as the input end of the feedback unit to receive the output voltage, and a second end serving as the output end of the feedback unit to provide the control signal to the voltage regulator. The second resistor has a first end coupled to the second end of the first resistor, and a second end connected to ground.

The present invention provides an apparatus of dynamic feedback control charge pump, which integrates the multiple effect of the charge pump, the voltage regulation characteristic of the voltage regulator, and the real-time detection and feedback capability of the feedback unit, for dynamically detecting and feeding back the output voltage, so as to respond to the current change caused by load in real time, thereby improving the output efficiency of the charge pump and reducing the output voltage ripple without adding additional elements and cost.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

The conventional charge pump cannot respond to the change at the output end in real time. When the current at the output end changes due to the load variation, the output voltage generated by the conventional charge pump has a serious ripple problem along with the current change. Accordingly, the present invention utilizes a feedback unit having the real-time detection and feedback capability in the following embodiments to achieve the effect of improving the output efficiency of the charge pump and reducing the output voltage ripple.

Figure 2:
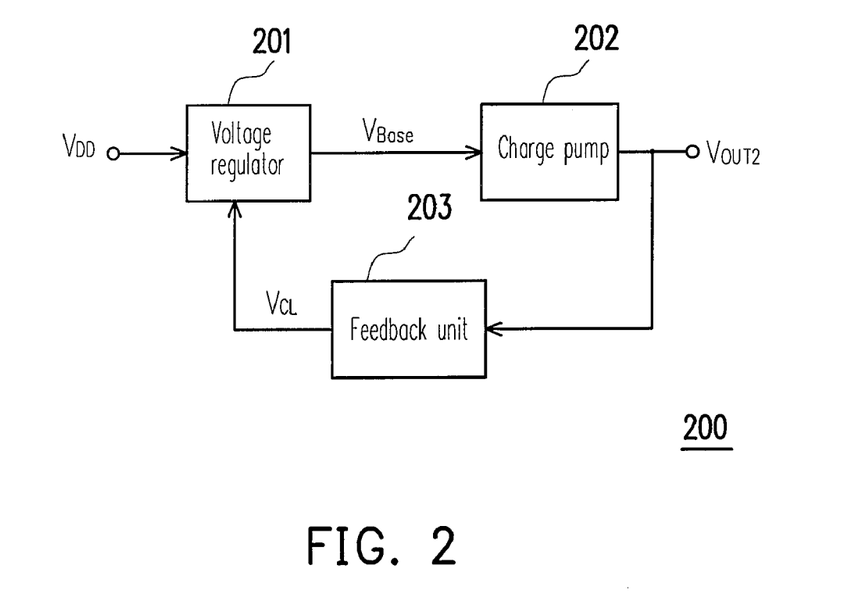
FIG. 2 is a schematic view of an apparatus of dynamic feedback control charge pump according to an embodiment of the present invention.

FIG. 2 is a schematic view of an apparatus of dynamic feedback control charge pump 200 according to an embodiment of the present invention. Referring to FIG. 2, the apparatus of dynamic feedback control charge pump 200 includes a voltage regulator 201, a charge pump 202, and a feedback unit 203. The voltage regulator 201 is coupled to the charge pump 202 and the feedback unit 203. The charge pump 202 is coupled to the feedback unit 203. An input end of the voltage regulator 201 receives an input voltage (e.g., a system voltage $V_{DD}$ in this embodiment), and regulates the system voltage $V_{DD}$ to a base voltage $V_{BASE}$ according to a control signal $V_{CL}$. An input end of the charge pump 202 receives the base voltage $V_{BASE}$, and provides multiple of the base voltage $V_{BASE}$ to an output voltage $V_{OUT2}$. An input end of the feedback unit 203 receives the output voltage $V_{OUT2}$, and the feedback unit 203 provides the control signal $V_{CL}$ to the voltage regulator 201 according to the output voltage $V_{OUT2}$. Therefore, this embodiment of the present invention can dynamically detect and feed back the output voltage $V_{OUT2}$, so as to rapidly respond to the change of load current, thereby improving the output efficiency of the charge pump and reducing the output voltage ripple.

Figure 3:
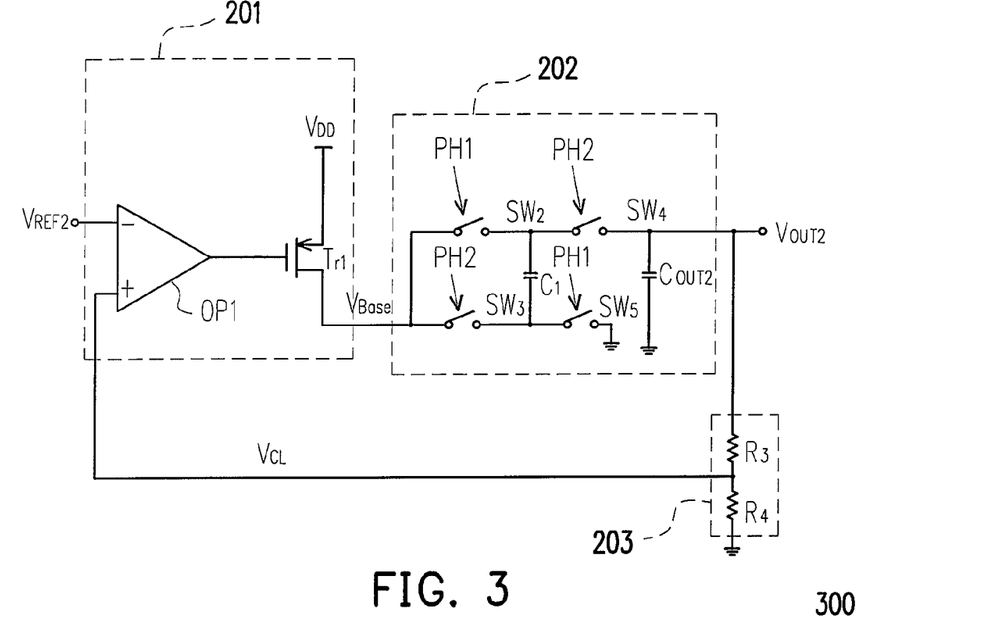
FIG. 3 is a circuit diagram of a first implementation of an apparatus of dynamic feedback control charge pump according to an embodiment of the present invention.

Various implementations of the above embodiment will be illustrated in the following embodiments. FIG. 3 is a circuit diagram of a first implementation of an apparatus 300 of dynamic feedback control charge pump according to an embodiment of the present invention. The voltage regulator 201 includes an operational amplifier OP1 and a transistor Tr1. A first end (e.g., a non-inverting input end in this embodiment) of the operational amplifier OP1 is coupled to an output end (i.e., a second end of a resistor R3) of the feedback unit, a second end (e.g., an inverting input end in this embodiment) receives a reference voltage $V_{REF2}$, and an output end is coupled to a gate of the transistor Tr1. A first source-drain (e.g., a source in this embodiment) of the transistor Tr1 receives the system voltage $V_{DD}$, and a second source-drain (e.g., a drain in this embodiment) serves as an output end of the voltage regulator 201 and is coupled to first ends of switches SW2 and SW3 to output the base voltage $V_{BASE}$. In this implementation, the transistor Tr1 is implemented by, but not limited to, a P-channel metal oxide semiconductor (PMOS) transistor.

The charge pump 202 includes a first capacitor C1, a second switch SW2, a third switch SW3, a fourth switch SW4, a fifth switch SW5, and an output capacitor $C_{OUT2}$. A second end of the switch SW2 is coupled to a first end of the capacitor C1. A second end of the switch SW3 is coupled to a second end of the capacitor C1. A first end of the switch SW4 is coupled to the first end of the capacitor C1, and a second end serves as an output end of the charge pump 202 to provide the output voltage $V_{OUT2}$. A first end of the switch SW5 is coupled to the second end of the capacitor C1, and a second end receives a second reference voltage (e.g., a ground voltage in this embodiment). A first end of the output capacitor $C_{OUT2}$ is coupled to the second end of the switch SW4, and a second end is coupled to the ground voltage. Those skilled in the art may omit the output capacitor $C_{OUT2}$ as desired.

The feedback unit 203 includes a first resistor R3 and a second resistor R4. A first end of the resistor R3 is coupled to the second end of the switch SW4. A first end of the resistor R4 is coupled to a second end of the resistor. R3, and a second end is connected to ground.

Figure 3A:
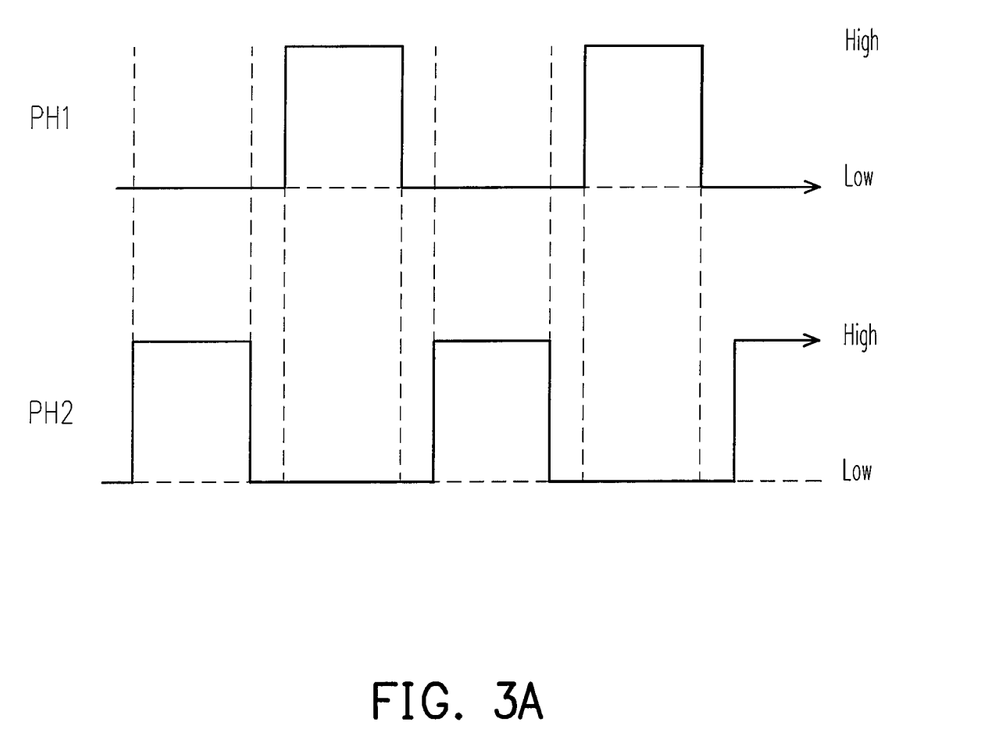
FIG. 3A is a diagram of a phase waveform of FIG. 3 according to an embodiment of the present invention.

FIG. 3A is a diagram of phase waveform of FIG. 3 according to an embodiment of the present invention. Referring to FIGS. 3 and 3A, PH1 and PH2 in FIG. 3A are respectively corresponding to control signals PH1 and PH2 in FIG. 3, high potential in the waveform indicates that the switch is short-circuited, and low potential in the waveform indicates that the switch is open-circuited. When receiving the system voltage $V_{DD}$, the transistor Tr1 regulates the system voltage $V_{DD}$ to the base voltage $V_{BASE}$ under the control of the operational amplifier OP1 and then transmits the base voltage $V_{BASE}$ to the first ends of the switches SW2 and SW3. When the control signal PH1 is at high potential (at this time, the control signal PH2 is at low potential), switches SW2 and SW5 are short-circuited, and switches SW3 and SW4 are open-circuited. Therefore, the base voltage $V_{BASE}$ charges the capacitor C1, such that the potential stored in the capacitor C1 is approximately equal to the potential of the base voltage $V_{BASE}$.

When the control signal PH2 is at high potential (at this time, the control signal PH1 is at low potential), the switches SW3 and SW4 are short-circuited, and the switches SW2 and SW5 are open-circuited, such that the second end of the capacitor C1 is disconnected from the ground but is connected to the base voltage $V_{BASE}$ (i.e., changes from 0V to $V_{BASE}$), and at this time the potential of the first end of the capacitor C1 is raised from approximately the potential of the base voltage $V_{BASE}$ to approximately $2V_{BASE}$. Therefore, the output voltage $V_{OUT2}$ is approximately twice the base voltage $V_{BASE}$. The output capacitor $C_{OUT2}$ makes the output voltage $V_{OUT2}$ more stable.

The resistors R3 and R4 are connected in series between the output end of the charge pump 202 and the ground, so as to divide the output voltage $V_{OUT2}$ to serve as the control signal $V_{CL}$. The control signal $V_{CL}$ is then transmitted to the first end of the operational amplifier OP1. When the current or voltage at the output end of the charge pump 202 changes due to load (not shown), the resistors R3 and R4 reflect the change through the control signal $V_{CL}$. As the control signal $V_{CL}$ changes along with the output end of the charge pump 202, the operational amplifier OP1 may dynamically control the transistor Tr1 in response to the change at the output end of the charge pump 202, such that the transistor Tr1 may rapidly regulate the base voltage $V_{BASE}$ in response to the change at the output end of the charge pump 202. Thus, in this embodiment, the output voltage $V_{OUT2}$ that is approximately twice the base voltage $V_{BASE}$ can be output, and the functions of dynamically feeding back the current change of the output end and regulating the voltage can be achieved, thereby reducing the ripple of the output voltage $V_{OUT2}$.

Figure 4:
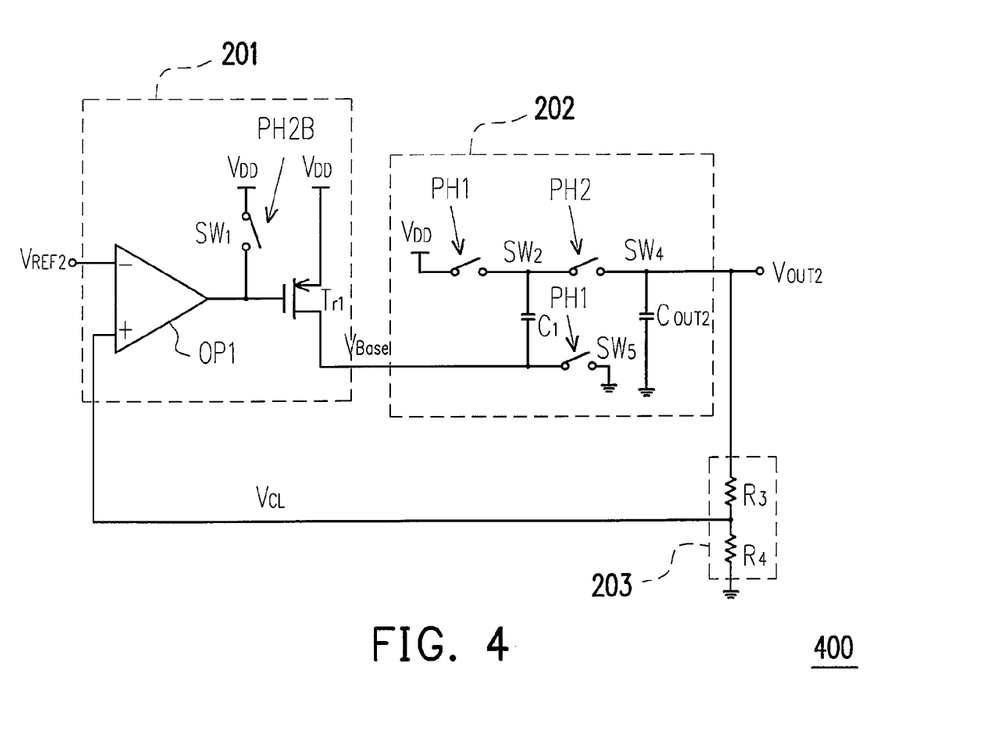
FIG. 4 is a circuit diagram of a second implementation of an apparatus of dynamic feedback control charge pump according- to an embodiment of the present invention.

FIG. 4 is a circuit diagram of a second implementation of an apparatus 400 of dynamic feedback control charge pump according to an embodiment of the present invention. Comparing FIGS. 3 and 4, the same functions are marked by the same reference numbers, and the difference therebetween resides in the switch SW1, switch SW2, and capacitor C1 in the apparatus 400 of dynamic feedback control charge pump. A first end of the switch SW1 receives the system voltage $V_{DD}$, and a second end is coupled to the output end of the operational amplifier OP1. A first end of the switch SW2 receives the system voltage $V_{DD}$. A second end of the capacitor C1 is coupled to the drain of the transistor Tr1. Compared with FIG. 3, the switch SW3 capable of resisting a large current is omitted, and the switch SW1 with a smaller area is disposed instead.

FIG. 4 is illustrated with reference to FIG. 3A, and the control signal PH2B is an inverted phase of the control signal PH2. When the control signal PH1 is at high potential (at this time, the control signal PH2 is at low potential, and the control signal PH2B is at high potential), the switches SW1, SW2 and SW5 are short-circuited, and the switch SW4 is open-circuited. The short circuit of the switch SW1 makes the transistor Tr1 to assume a non-conducted state (turn-off). During this period, the system voltage $V_{DD}$ charges the capacitor C1 through the switch SW2, such that the capacitor C1 stores the potential approximately equal to the system voltage $V_{DD}$. As the system voltage $V_{DD}$ may directly charge the capacitor C1, the charging speed is much faster. When the control signal PH2 is at high potential (at this time, the control signals PH2B, PH1 are at low potential), the switch SW4 is short-circuited, and the switches SW1, SW2 and SW5 are open-circuited. The transistor Tr1 is controlled by the operational amplifier OP1 to output the base voltage $V_{BASE}$ to the second end of the capacitor C1. As the second end of the capacitor C1 is disconnected from the ground (i.e., 0V) but is connected to the base voltage $V_{BASE}$, the potential at the first end of the capacitor C1 is raised from $V_{DD}$ to $V_{DD}+V_{BASE}$. The $V_{DD}+V_{BASE}$ is then output by the switch SW4 to serve as the output voltage $V_{OUT2}$.

The resistors R3 and R4 are connected in series between the output end of the charge pump 202 and the ground, so as to divide the output voltage $V_{OUT2}$ to serve as the control signal $V_{CL}$. The control signal $V_{CL}$ is then transmitted to the first end of the operational amplifier OP1. When the current or voltage at the output end of the charge pump 202 changes due to load (not shown), the feedback unit 203 reflects the change through the control signal $V_{CL}$. As the control signal $V_{CL}$ changes along with the output end of the charge pump 202, the operational amplifier OP1 can dynamically control the transistor Tr1 in response to the change at the output end of the charge pump 202. Therefore, the transistor Tr1 can rapidly regulate the base voltage $V_{BASE}$ in response to the change at the output end of the charge pump 202, thereby regulating the output voltage $V_{OUT2}$ of the charge pump 202. Thus, in this embodiment, the functions of dynamically feeding back the change of the output end and transmitting its response more rapidly to the output end so as to regulate the voltage can be achieved, thereby reducing the ripple of the output voltage $V_{OUT2}$ and improving the output efficiency.

Figure 5:
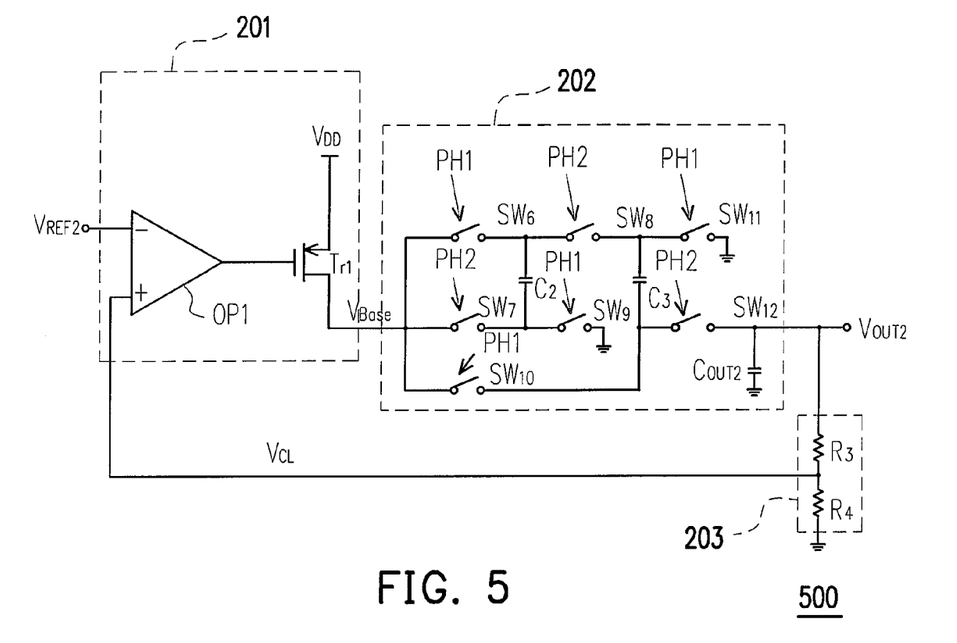
FIG. 5 is a circuit diagram of a third implementation of an apparatus of dynamic feedback control charge pump according to an embodiment of the present invention.

FIG. 5 is a circuit diagram of a third implementation of an apparatus 500 of dynamic feedback control charge pump according to an embodiment of the present invention. The voltage regulator 201 and the feedback unit 203 are the same as those described in the embodiment of FIG. 3, and will not be described herein again. The charge pump 202 includes a second capacitor C2, a third capacitor C3, a sixth switch SW6, a seventh switch SW7, an eighth switch SW8, a ninth switch SW9, a tenth switch SW10, an eleventh switch SW11, a twelfth switch SW12, and an output capacitor $C_{OUT2}$ A first end of the switch SW6 is coupled to the drain of the transistor Tr1 to receive the base voltage $V_{BASE}$, and a second end is coupled to a first end of the capacitor C2. A first end of the switch SW7 is coupled to the first end of the switch SW6, and a second end is coupled to a second end of the capacitor C2. A first end of the switch SW8 is coupled to the first end of the capacitor C2, and a second end is coupled to a first end of the capacitor C3. A first end of the switch SW9 is coupled to the second end of the capacitor C2, and a second end receives the ground voltage. A first end of the switch SW10 is coupled to the first end of the switch SW6, and a second end is coupled to a second end of the capacitor C3. A first end of the switch SW11 is coupled to the first end of the capacitor C3, and a second end receives the ground voltage. A first end of the switch SW12 is coupled to the second end of the capacitor C3, and a second end provides the output voltage $V_{OUT2}$ to the output end of the charge pump 202. A first end of the output capacitor $C_{OUT2}$ is coupled to the second end of the switch SW12, and a second end is coupled to the ground voltage. Those skilled in the art can omit the output capacitor $C_{OUT2}$ as desired.

FIG. 5 is illustrated with reference to FIG. 3A. When receiving the system voltage $V_{DD}$, the transistor Tr1 is controlled by the operational amplifier OP1 to regulate the system voltage $V_{DD}$ to the base voltage $V_{BASE}$, and then transmit the base voltage $V_{BASE}$ to the first end of the switch SW6. When the control signal PH1 is at high potential (at this time, the control signal PH2 is at low potential), the switches SW6, SW9, SW10, and SW11 are short-circuited, and the switches SW7, SW8, and SW12 are open-circuited. Therefore, the base voltage $V_{BASE}$ charges the capacitors C2 and C3 respectively, such that the potential stored in the capacitors C2 and C3 is approximately equal to the potential of the base voltage $V_{BASE}$. When the control signal PH2 is at high potential (at this time, the control signal PH1 is at low potential), the switches SW7, SW8, and SW12 are short-circuited, and the switches SW6, SW9, SW10, and SW11 are open-circuited, such that the second end of the capacitor C2 is disconnected from the ground but is connected to the base voltage $V_{BASE}$ (i.e., changes from 0V to $V_{BASE}$), and the potential at the first end of the capacitor C2 is raised from approximately the potential of the base voltage $V_{BASE}$ to approximately $2V_{BASE}$. At the same time, the first end of the capacitor C3 is disconnected from the ground but is connected to the first end of the capacitor C2 (i.e., changed from 0V to $2V_{BASE}$), the potential at the second end of the capacitor C3 is raised from approximately the potential of the base voltage $V_{BASE}$ to approximately $3V_{BASE}$. Therefore, the output voltage $V_{OUT2}$ is approximately a triple of the base voltage $V_{BASE}$. The output capacitor $C_{OUT2}$ makes the output voltage $V_{OUT2}$ more stable.

The resistors R3 and R4 are connected in series between the output end of the charge pump 202 and the ground, so as to divide the output voltage $V_{OUT2}$ to serve as the control signal $V_{CL}$. The control signal $V_{CL}$ is then transmitted to the first end of the operational amplifier OP1. When the current or voltage at the output end of the charge pump 202 changes due to load (not shown), the resistors R3 and R4 reflect the change through the control signal $V_{CL}$. As the control signal $V_{CL}$ changes along with the output end of the charge pump 202, the operational amplifier OP1 can dynamically control the transistor Tr1 in response to the change at the output end of the charge pump 202. Therefore, the transistor Tr1 can rapidly regulate the base voltage $V_{BASE}$ in response to the change at the output end of the charge pump 202. Thus, in this embodiment, the output voltage $V_{OUT2}$ that is approximately a triple of the base voltage $V_{BASE}$ is output, and the functions of dynamically feeding back the change of the output end and regulating the voltage can be achieved, thereby reducing the ripple of the output voltage $V_{OUT2}$.

Figure 6:
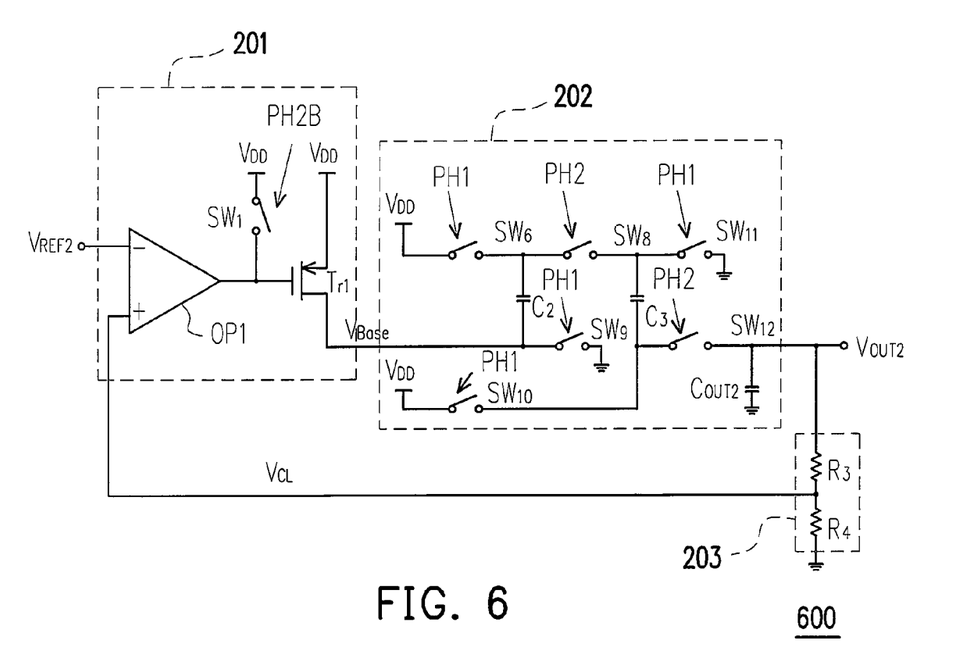
FIG. 6 is a circuit diagram of a fourth implementation of an apparatus of dynamic feedback control charge pump according to an embodiment of the present invention.

FIG. 6 is a circuit diagram of a fourth implementation of an apparatus 600 of dynamic feedback control charge pump according to an embodiment of the present invention. Comparing FIGS. 5 and 6, the same functions are marked by the same reference numbers, and the difference therebetween resides in the switch SW1, switch SW2, and capacitor C2 in the apparatus 600 of dynamic feedback control charge pump. A first end of the switch SW1 receives the system voltage $V_{DD}$, and a second end is coupled to the output end of the operational amplifier OP1. A first end of the switch SW6 receives the system voltage $V_{DD}$. A second end of the capacitor C2 is directly coupled to the drain of the transistor Tr1. Compared with FIG. 5, the switch SW7 capable of resisting a large current is omitted, and the switch SW1 with a smaller area is disposed instead.

FIG. 6 is illustrated with reference to FIG. 3A, and the control signal PH2B is an inverted phase of the control signal PH2. When the control signal PH1 is at high potential (at this time, the control signal PH2 is at low potential, and the control signal PH2B is at high potential), the switches SW1, SW6, SW9, SW 10, and SW11 are short-circuited, and the switches SW8 and SW 12 are open-circuited. The short circuit of the switch SW1 makes the transistor Tr1 to assume a non-conducted state (turn-off). During this period, the system voltage $V_{DD}$ charges the capacitors C2 and C3 through the switches SW6 and SW10, such that the capacitors C2 and C3 respectively store the potential approximately equal to the system voltage $V_{DD}$. As the system voltage $V_{DD}$ may directly charge the capacitors C2 and C3, the charging speed is much faster. When the control signal PH2 is at high potential (at this time, the control signals PH2B, PH1 are at low potential), the switches SW8 and SW12 are short-circuited, and the switches SW1, SW6, SW9, SW 10, and SW11 are open-circuited. The transistor Tr1 is controlled by the operational amplifier OP1 to output the base voltage $V_{BASE}$ to the second end of the capacitor C2. As the second end of the capacitor C2 is disconnected from the ground (i.e., 0V) but is connected to the base voltage $V_{BASE}$, the potential at the first end of the capacitor C2 is raised from $V_{DD}$ to $V_{DD}+V_{BASE}$. At the same time, the first end of C3 is disconnected from the ground (i.e., 0V) but is connected to the first end of the capacitor C2, such that the potential at the second end of the capacitor C3 is raised from $V_{DD}$ to $2V_{DD}+V_{BASE}$. The $2V_{DD}+V_{BASE}$ is then output by the switch SW12 to serve as the output voltage $V_{OUT2}$.

The resistors R3 and R4 are connected in series between the output end of the charge pump 202 and the ground, so as to divide the output voltage $V_{OUT2}$ to serve as the control signal $V_{CL}$. The control signal $V_{CL}$ is then transmitted to the first end of the operational amplifier OP1. When the current or voltage at the output end of the charge pump 202 changes due to load (not shown), the feedback unit 203 reflects the change through the control signal $V_{CL}$. As the control signal $V_{CL}$ changes along with the output end of the charge pump 202, the operational amplifier OP1 can dynamically control the transistor Tr1 in response to the change at the output end of the charge pump 202. Therefore, the transistor Tr1 can rapidly regulate the base voltage $V_{BASE}$ in response to the change at the output end of the charge pump 202, thereby regulating the output voltage $V_{OUT2}$ of the charge pump 202. Thus, in this embodiment, the functions of dynamically feeding back the change of the output end and transmitting its response more rapidly to the output end to regulate the voltage can be achieved, thereby reducing the ripple of the output voltage $V_{OUT2}$ and improving the output efficiency.

Figure 7:
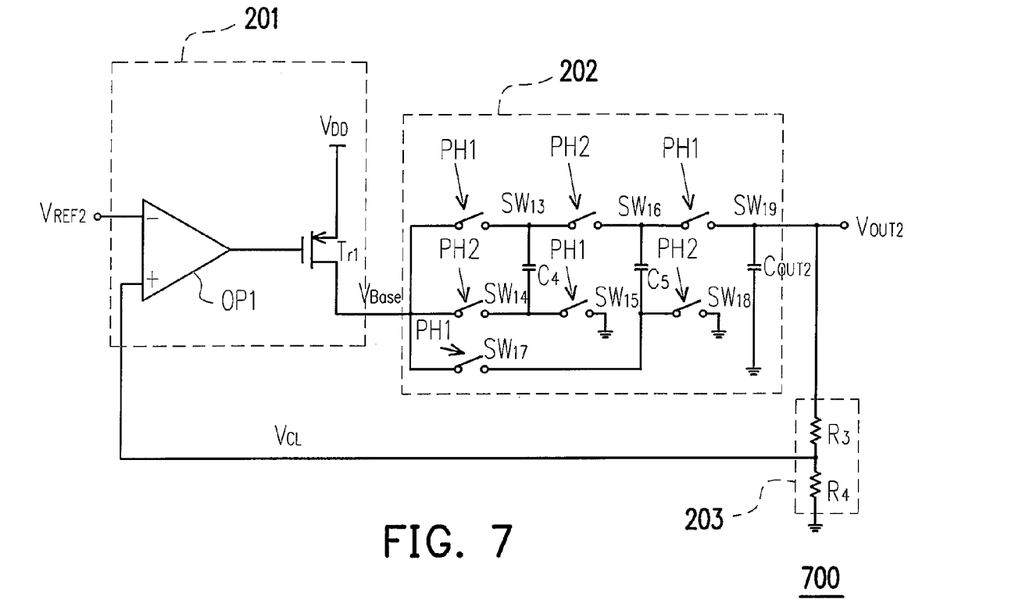
FIG. 7 is a circuit diagram of a fifth implementation of an apparatus of dynamic feedback control charge pump according to an embodiment of the present invention.

FIG. 7 is a circuit diagram of a fifth implementation 700 of an apparatus of dynamic feedback control charge pump according to an embodiment of the present invention. The voltage regulator 201 and the feedback unit 203 are the same as those described in the embodiment of FIG. 3, and will not be described herein again. The charge pump 202 includes a fourth capacitor C4, a fifth capacitor C5, a thirteenth switch SW13, a fourteenth switch SW14, a fifteenth switch SW15, a sixteenth switch SW16, a seventeenth switch SW17, an eighteenth switch SW18, a nineteenth switch SW19, and an output capacitor $C_{OUT2}$. A first end of the switch SW13 is coupled to the drain of the transistor Tr1 to receive the base voltage $V_{BASE}$, and a second end is coupled to a first end of the capacitor C4. A first end of the switch SW14 is coupled to the first end of the switch SW13, and a second end is coupled to a second end of the capacitor C4. A first end of the switch SW15 is coupled to the second end of the capacitor C4, and a second end receives the ground voltage. A first end of the switch SW16 is coupled to the first end of the capacitor C4, and a second end is coupled to a first end of the capacitor C5. A first end of the switch SW17 is coupled to the first end of the switch SW13, and a second end is coupled to a second end of the capacitor C5. A first end of the switch SW18 is coupled to the second end of the capacitor C5, and a second end receives the ground voltage. A first end of the switch SW19 is coupled to the first end of the capacitor C5, and a second end provides the output voltage $V_{OUT2}$ to the output end of the charge pump 202. A first end of the output capacitor $C_{OUT2}$ is coupled to the second end of the switch SW19, and a second end is coupled to the ground voltage. Those skilled in the art can omit the output capacitor $C_{OUT2}$ as desired.

FIG. 7 is illustrated with reference to FIG. 3A. When receiving the system voltage $V_{DD}$, the transistor Tr1 is controlled by the operational amplifier OP1 to regulate the system voltage $V_{DD}$ to the base voltage $V_{BASE}$, and then transmit the base voltage $V_{BASE}$ to the first end of the switch SW13. When the control signal PH1 is at high potential (at this time, the control signal PH2 is at low potential), the switches SW13, SW15, SW17, and SW19 are short-circuited, and the switches SW14, SW16, and SW18 are open-circuited. During this period, the base voltage $V_{BASE}$ charges the capacitor C4, such that the potential stored in the capacitor C4 is approximately equal to the potential of the base voltage $V_{BASE}$. At the same time, the second end of the capacitor C5 is disconnected from the ground but is connected to the base voltage $V_{BASE}$ (i.e., changes from 0V to $V_{BASE}$), and the potential at the first end of the capacitor C5 is raised from $2V_{BASE}$ (obtained when the control signal PH2 is at high potential) to $3V_{BASE}$. Therefore, the output voltage $V_{OUT2}$ is approximately a triple of the base voltage $V_{BASE}$. When the control signal PH2 is at high potential, the switches SW14, SW16, and SW18 are short-circuited, and the switches SW13, SW15, SW17, and SW19 are open-circuited. At this time, the second end of the capacitor C4 is disconnected from the ground but is connected to the base voltage $V_{BASE}$ (i.e., changes from 0V to $V_{BASE}$), and the potential at the first end of the capacitor C4 is raised from approximately the potential of the base voltage $V_{BASE}$ to $2V_{BASE}$. At the same time, the first end of the capacitor C5 is connected to the first end of the capacitor C4, and the second end is connected to ground. Therefore, the potential $2V_{BASE}$ at the first end of the capacitor C4 charges the capacitor C5, such that the potential stored in the capacitor C5 is approximately equal to the potential of $2V_{BASE}$. The output capacitor $C_{OUT2}$ makes the output voltage $V_{OUT2}$ more stable.

The resistors R3 and R4 are connected in series between the output end of the charge pump 202 and the ground, so as to divide the output voltage $V_{OUT2}$ to serve as the control signal $V_{CL}$. The control signal $V_{CL}$ is then transmitted to the first end of the operational amplifier OP1. When the current or voltage at the output end of the charge pump 202 changes due to load (not shown), the resistors R3 and R4 reflect the change through the control signal $V_{CL}$. As the control signal $V_{CL}$ changes along with the output end of the charge pump 202, the operational amplifier OP1 can dynamically control the transistor Tr1 in response to the change at the output end of the charge pump 202. Therefore, the transistor Tr1 can rapidly regulate the base voltage $V_{BASE}$ in response to the change at the output end of the charge pump 202. Thus, in this embodiment, the output voltage $V_{OUT2}$ that is approximately a triple of the base voltage $V_{BASE}$ is output, and the functions of dynamically feeding back the change of the output end and regulating the voltage can be achieved, thereby reducing the ripple of the output voltage $V_{OUT2}$.

Figure 8:
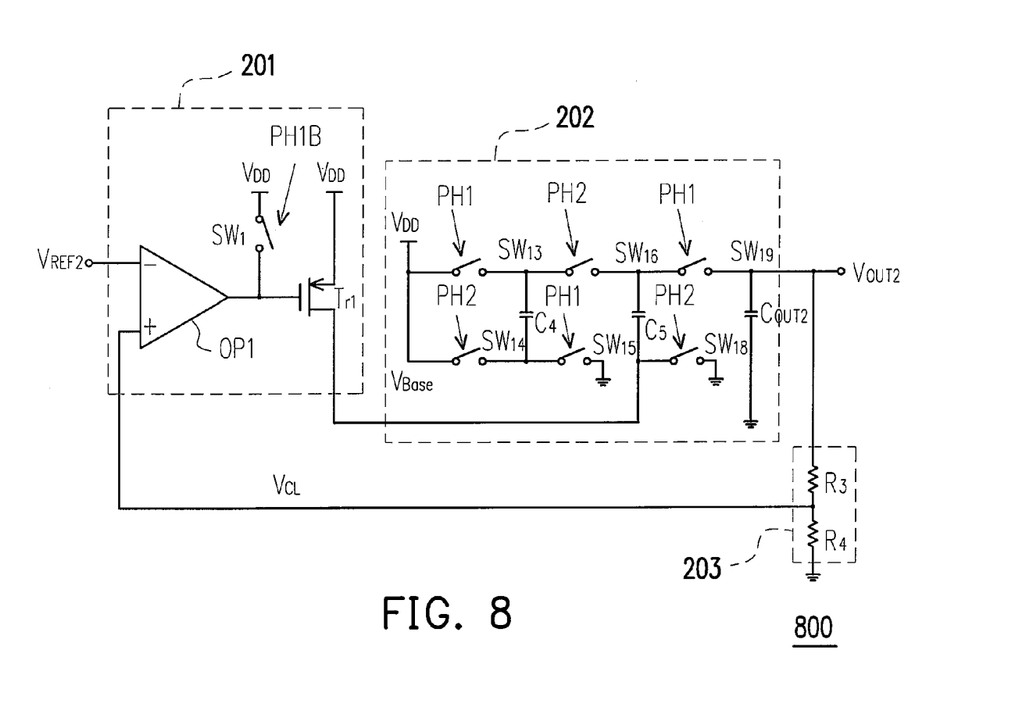
FIG. 8 is a circuit diagram of a sixth implementation according of an apparatus of dynamic feedback control charge pump according to an embodiment of the present invention.

FIG. 8 is a circuit diagram of a sixth implementation of an apparatus 800 of dynamic feedback control charge pump according to an embodiment of the present invention. Comparing FIGS. 7 and 8, the same functions are marked by the same reference numbers, and the difference therebetween resides in the switches SW1, SW13, SW14, and the capacitor C4 in the apparatus of dynamic feedback control charge pump 800. A first end of the switch SW1 receives the system voltage $V_{DD}$, and a second end is coupled to the output end of the operational amplifier OP1. A first end of the switch SW13 receives the system voltage $V_{DD}$. A first end of the switch SW14 is coupled to the first end of the switch SW13. A second end of the capacitor C5 is directly coupled to the drain of the transistor Tr1. Compared with FIG. 5, in this embodiment, the switch SW17 capable of resisting a large current is omitted, and the switch SW1 with a smaller area is disposed instead.

FIG. 8 is illustrated with reference to FIG. 3A, and the control signal PH1B is an inverted phase of the control signal PH1. When the control signal PH1 is at high potential (at this time, the control signals PH2, PH1B are at low potential), the switches SW13, SW15, and SW19 are short-circuited, and the switches SW1, SW14, SW16, and SW18 are open-circuited. The transistor Tr1 is controlled by the operational amplifier OP1 to output the base voltage $V_{BASE}$ to the second end of the capacitor C5. During this period, the system voltage $V_{DD}$ charges the capacitor C4 through the switch SW13, such that the capacitor C4 stores the potential approximately equal to the system voltage $V_{DD}$. The second end of the capacitor C5 is disconnected from the ground but is connected to the base voltage $V_{BASE}$ (i.e., changes from 0V to $V_{BASE}$), the potential at the first end of the capacitor C5 is raised from $2V_{DD}$ (obtained when the control signal PH2 is at high potential) to $2V_{DD}+V_{BASE}$. The $2V_{DD}+V_{BASE}$ is then output by the switch SW12 to serve as the output voltage $V_{OUT2}$. When the control signal PH2 is at high potential (at this time, the control signal PH1 is at low potential, and PH1B is at high potential), the switches SW1, SW14, SW16, and SW18 are short-circuited, and the switches SW13, SW15, and SW19 are open-circuited. The short circuit of the switch SW1 makes the transistor Tr1 to assume a non-conducted state (turn-off). At this time, the second end of the capacitor C4 is disconnected from the ground but is connected to the system voltage $V_{DD}$ (i.e., changes from 0V to $V_{DD}$), the potential at the first end of the capacitor C4 is raised from the potential of the system voltage $V_{DD}$ to $2V_{DD}$. At the same time, the first end of the capacitor C5 is connected to the first end of the capacitor C4, and the second end is connected to ground. Therefore, the potential $2V_{DD}$ at the first end of the capacitor C4 charges the capacitor C5, such that the potential stored in the capacitor C5 is approximately equal to $2V_{DD}$. As the system voltage $V_{DD}$ can directly charge the capacitor C4, the charging speed is much faster. The output capacitor $C_{OUT2}$ makes the output voltage $V_{OUT2}$ more stable.

The resistors R3 and R4 are connected in series between the output end of the charge pump 202 and the ground, so as to divide the output voltage $V_{OUT2}$ to serve as the control signal $V_{CL}$. The control signal $V_{CL}$ is then transmitted to the first end of the operational amplifier OP1. When the current or voltage at the output end of the charge pump 202 changes due to load (not shown), the feedback unit 203 reflects the change through the control signal $V_{CL}$. As the control signal $V_{CL}$ changes along with the output end of the charge pump 202, the operational amplifier OP1 can dynamically control the transistor Tr1 in response to the change at the output end of the charge pump 202. Therefore, the transistor Tr1 can rapidly regulate the base voltage $V_{BASE}$ in response to the change at the output end of the charge pump 202, thereby regulating the output voltage $V_{OUT2}$ of the charge pump 202. Thus, in this embodiment, the functions of dynamically feeding back the change of the output end and transmitting its response more rapidly to the output end to regulate the voltage can be achieved, thereby reducing the ripple of the output voltage $V_{OUT2}$ and improving the output efficiency.

In view of the above, the apparatus of dynamic feedback control charge pump of the present invention can rapidly respond to the change of the load current at the output end through direct feedback, such that the voltage of the output end will not fluctuate when the current changes, thereby reducing the output voltage ripple. Moreover, the system voltage is used to directly charge the capacitor, and the output efficiency is thus improved. Therefore, the apparatus of dynamic feedback control charge pump of the present invention can detect and feed back the current change of its output end in real time, and thus can rapidly feed back the current change and make response at the output end.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A charge pump apparatus, comprising:
   a voltage regulator, for receiving an input voltage, and regulating the input voltage to a base voltage according to a control signal;
   a charge pump, coupled to an output end of the voltage regulator, for receiving the base voltage, and providing multiple of the base voltage to an output voltage; and
   a feedback unit, comprising an input end coupled to an output end of the charge pump to receive the output voltage, and an output end coupled to the voltage regulator to provide the control signal, wherein the control signal is related to the output voltage, wherein the voltage regulator comprises:

an operational amplifier, comprising a first end coupled to the output end of the feedback unit to receive the control signal, and a second end receiving a reference voltage;

a transistor, comprising a gate coupled to an output end of the operational amplifier, a first source-drain receiving the input voltage, and a second source-drain serving as the output end of the voltage regulator to output the base voltage; and a switch, comprising a first end receiving the input voltage, and a second end coupled to the output end of the operational amplifier.

2. The charge pump apparatus according to claim 1, wherein the transistor is a P-channel metal-oxide semiconductor (PMOS) transistor.

3. The charge pump apparatus according to claim 1, wherein the charge pump comprises:
a first capacitor;
a second switch, coupled between the output end of the voltage regulator and a first end of the first capacitor;
a third switch, coupled between the output end of the voltage regulator and a second end of the first capacitor;
a fourth switch, comprising a first end coupled to the first end of the first capacitor, a second end serving as the output end of the charge pump to output the output voltage; and
a fifth switch, comprising a first end coupled to the second end of the first capacitor, and a second end receiving a second reference voltage.

4. The charge pump apparatus according to claim 3, wherein the second reference voltage is a ground voltage.

5. The charge pump apparatus according to claim 3, wherein the charge pump further comprises an output capacitor, comprising a first end coupled to the second end of the fourth switch, and a second end receiving the second reference voltage.

6. The charge pump apparatus according to claim 1, wherein the charge pump comprises:
a second switch, comprising a first end receiving the input voltage;
a first capacitor, comprising a first end coupled to a second end of the second switch, and a second end coupled to the output end of the voltage regulator to receive the base voltage;
a fourth switch, comprising a first end coupled to the first end of the first capacitor, and a second end serving as the output end of the charge pump to output the output voltage; and
a fifth switch, comprising a first end coupled to the second end of the first capacitor, and a second end receiving a second reference voltage.

7. The charge pump apparatus according to claim 6, wherein the second reference voltage is a ground voltage.

8. The charge pump apparatus according to claim 6, wherein the charge pump further comprises an output capacitor, comprising a first end coupled to the second end of the fourth switch, and a second end receiving the second reference voltage.

9. The charge pump apparatus according to claim 1, wherein the charge pump comprises:
a second capacitor;
a third capacitor;
a sixth switch, coupled between the output end of the voltage regulator and a first end of the second capacitor;
a seventh switch, coupled between the output end of the voltage regulator and a second end of the second capacitor;

an eighth switch, coupled between the first end of the second capacitor and a first end of the third capacitor;
a ninth switch, comprising a first end coupled to the second end of the second capacitor, and a second end receiving a second reference voltage;
a tenth switch, coupled between the output end of the voltage regulator and a second end of the third capacitor;
an eleventh switch, comprising a first end coupled to the first end of the third capacitor, and a second end receiving the second reference voltage; and
a twelfth switch, comprising a first end coupled to the second end of the third capacitor, and a second end serving as the output end of the charge pump to output the output voltage.

10. The charge pump apparatus according to claim 9, wherein the second reference voltage is a ground voltage.

11. The charge pump apparatus according to claim 9, wherein the charge pump further comprises an output capacitor, comprising a first end coupled to the second end of the twelfth switch, and a second end receiving the second reference voltage.

12. The charge pump apparatus according to claim 1, wherein the charge pump comprises:
a sixth switch, comprising a first end receiving the input voltage;
a second capacitor, comprising a first end coupled to a second end of the sixth switch, and a second end coupled to the output end of the voltage regulator to receive the base voltage;
a third capacitor;
an eighth switch, coupled between the first end of the second capacitor and the first end of the third capacitor;
a ninth switch, comprising a first end coupled to the second end of the second capacitor, and a second end receiving a second reference voltage;
a tenth switch, comprising a first end receiving the input voltage, and a second end coupled to a second end of the third capacitor;
an eleventh switch, comprising a first end coupled to a first end of the third capacitor, and a second end receiving the second reference voltage; and
a twelfth switch, comprising a first end coupled to the second end of the third capacitor, and a second end serving as the output end of the charge pump to output the output voltage.

13. The charge pump apparatus according to claim 12, wherein the second reference voltage is a ground voltage.

14. The charge pump apparatus according to claim 12, wherein the charge pump further comprises an output capacitor, comprising a first end coupled to the second end of the twelfth switch, and a second end receiving the second reference voltage.

15. The charge pump apparatus according to claim 1, wherein the charge pump comprises:
a fourth capacitor;
a fifth capacitor;
a thirteenth switch, coupled between the output of the voltage regulator and a first end of the fourth capacitor;
a fourteenth switch, coupled between the output end of the voltage regulator and a second end of the fourth capacitor;
a fifteenth switch, comprising a first end coupled to the second end of the fourth capacitor, and a second end receiving a second reference voltage;
a sixteenth switch, coupled between the first end of the fourth capacitor and a first end of the fifth capacitor;

a seventeenth switch, coupled between the output end of the voltage regulator and a second end of the fifth capacitor;

an eighteenth switch, comprising a first end coupled to the second end of the fifth capacitor, and a second end receiving the second reference voltage; and a nineteenth switch, comprising a first end coupled to the first end of the fifth capacitor, and a second end serving as the output end of the charge pump to output the output voltage.

16. The charge pump apparatus according to claim 15, wherein the second reference voltage is a ground voltage.

17. The charge pump apparatus according to claim 15, wherein the charge pump further comprises an output capacitor, comprising a first end coupled to the second end of the nineteenth switch, and a second end receiving the second reference voltage.

18. The charge pump apparatus according to claim 1, wherein the charge pump comprises:

a fourth capacitor;

a fifth capacitor, comprising a second end coupled to the output end of the voltage regulator to receive the base voltage;

a thirteenth switch, comprising a first end coupled to a first end of the fourth capacitor, and a second end receiving the input voltage;

a fourteenth switch, comprising a first end coupled to a second end of the fourth capacitor, and a second end receiving the input voltage;

a fifteenth switch, comprising a first end coupled to the second end of the fourth capacitor, and a second end receiving a second reference voltage;

a sixteenth switch, coupled between the first end of the fourth capacitor and a first end of the fifth capacitor;

an eighteenth switch, comprising a first end coupled to the second end of the fifth capacitor, and a second end receiving the second reference voltage; and a nineteenth switch, comprising a first end coupled to the first end of the fifth capacitor, and a second end serving as the output end of the charge pump to output the output voltage.

19. The charge pump apparatus according to claim 18, wherein the second reference voltage is a ground voltage.

20. The charge pump apparatus according to claim 18, wherein the charge pump further comprises an output capacitor, comprising a first end coupled to the second end of the nineteenth switch, and a second end receiving the second reference voltage.

21. The charge pump apparatus according to claim 1, wherein the feedback unit comprises:

a first resistor, comprising a first end serving as the input end of the feedback unit to receive the output voltage, and a second end serving as the output end of the feedback unit to provide the control signal to the voltage regulator; and a second resistor, comprising a first end coupled to the second end of the first resistor, and a second end grounded.

22. The charge pump apparatus according to claim 1, wherein the input voltage is a system voltage.

* * * * *